US012662114B2

(12) United States Patent　　　　(10) Patent No.:　US 12,662,114 B2
Kaneda et al.　　　　　　　　　　　(45) Date of Patent:　　Jun. 23, 2026

(54) DRIVING ASSISTANCE DEVICE, DRIVING ASSISTANCE METHOD, AND PROGRAM

(71) Applicant: HONDA MOTOR CO., LTD., Tokyo (JP)

(72) Inventors: Yuji Kaneda, Wako (JP); Ryo Ushiki, Wako (JP); Takuya Furukawa, Wako (JP); Jun Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 18/846,673

(22) PCT Filed: Mar. 18, 2022

(86) PCT No.: PCT/JP2022/012640
　　　§ 371 (c)(1),
　　　(2) Date: Sep. 13, 2024

(87) PCT Pub. No.: WO2023/175911
　　　PCT Pub. Date: Sep. 21, 2023

(65) Prior Publication Data
　　　US 2025/0196848 A1　　Jun. 19, 2025

(51) Int. Cl.
　　　*B60W 10/18*　　　(2012.01)
　　　*B60W 10/20*　　　(2006.01)
　　　(Continued)

(52) U.S. Cl.
　　　CPC ............ *B60W 30/09* (2013.01); *B60W 10/18* (2013.01); *B60W 10/20* (2013.01);
　　　(Continued)

(58) Field of Classification Search
　　　CPC ...... B60W 30/09; B60W 10/18; B60W 10/20; B60W 30/0956; B60W 30/146;
　　　(Continued)

(56) References Cited

U.S. PATENT DOCUMENTS

| 2020/0406969 A1* | 12/2020 | Ersal ...................... B60W 10/20 |
| 2023/0063613 A1* | 3/2023 | Gao ................ B60W 30/18172 |
| 2024/0034314 A1* | 2/2024 | Kinugawa ................ G08G 1/16 |

FOREIGN PATENT DOCUMENTS

| JP | 2004-268819 | 9/2004 |
| JP | 2013-126823 | 6/2013 |
| JP | 2020-050010 | 4/2020 |

OTHER PUBLICATIONS

International Search Report and Written Opinion for International Application No. PCT/JP2022/012640 mailed on Jun. 7, 2022, 8 pages.

* cited by examiner

*Primary Examiner* — Mathew Franklin Gordon
(74) *Attorney, Agent, or Firm* — Amin, Turocy & Watson, LLP

(57)　　　　　　ABSTRACT

A driving assistance device including: a controller configured to stop a vehicle by instructing a brake device of the vehicle in a case in which the degree of approach between a target object among objects and the vehicle satisfies a first condition by referring to an output of a detection device detecting presence of the objects that are present in front of the vehicle; and a steering avoidance controller configured to instruct a steering device of the vehicle to avoid contact with the target object using steering, in which the controller restricts a preliminary operation performed in a case in which the target object is present on a curved road more than a preliminary operation performed in a case in which the target object is not present on a curved road; and the preliminary operation is executed in a case in which the degree of approach between the vehicle and the target object is lower than the first condition.

11 Claims, 12 Drawing Sheets

(51) Int. Cl.

| | |
|---|---|
| *B60W 30/09* | (2012.01) |
| *B60W 30/095* | (2012.01) |
| *B60W 30/14* | (2006.01) |
| *B60W 50/14* | (2020.01) |
| *G06V 20/56* | (2022.01) |

(52) U.S. Cl.
CPC ...... *B60W 30/0956* (2013.01); *B60W 30/146*
(2013.01); *B60W 50/14* (2013.01); *G06V*
*20/588* (2022.01); *B60W 2420/403* (2013.01);
*B60W 2552/30* (2020.02); *B60W 2552/53*
(2020.02); *B60W 2556/40* (2020.02)

(58) Field of Classification Search
CPC ............. B60W 50/14; B60W 2552/53; B60W
2556/40; B60W 2552/30; B60W
2420/403; G06V 20/588
See application file for complete search history.

Figure 8:
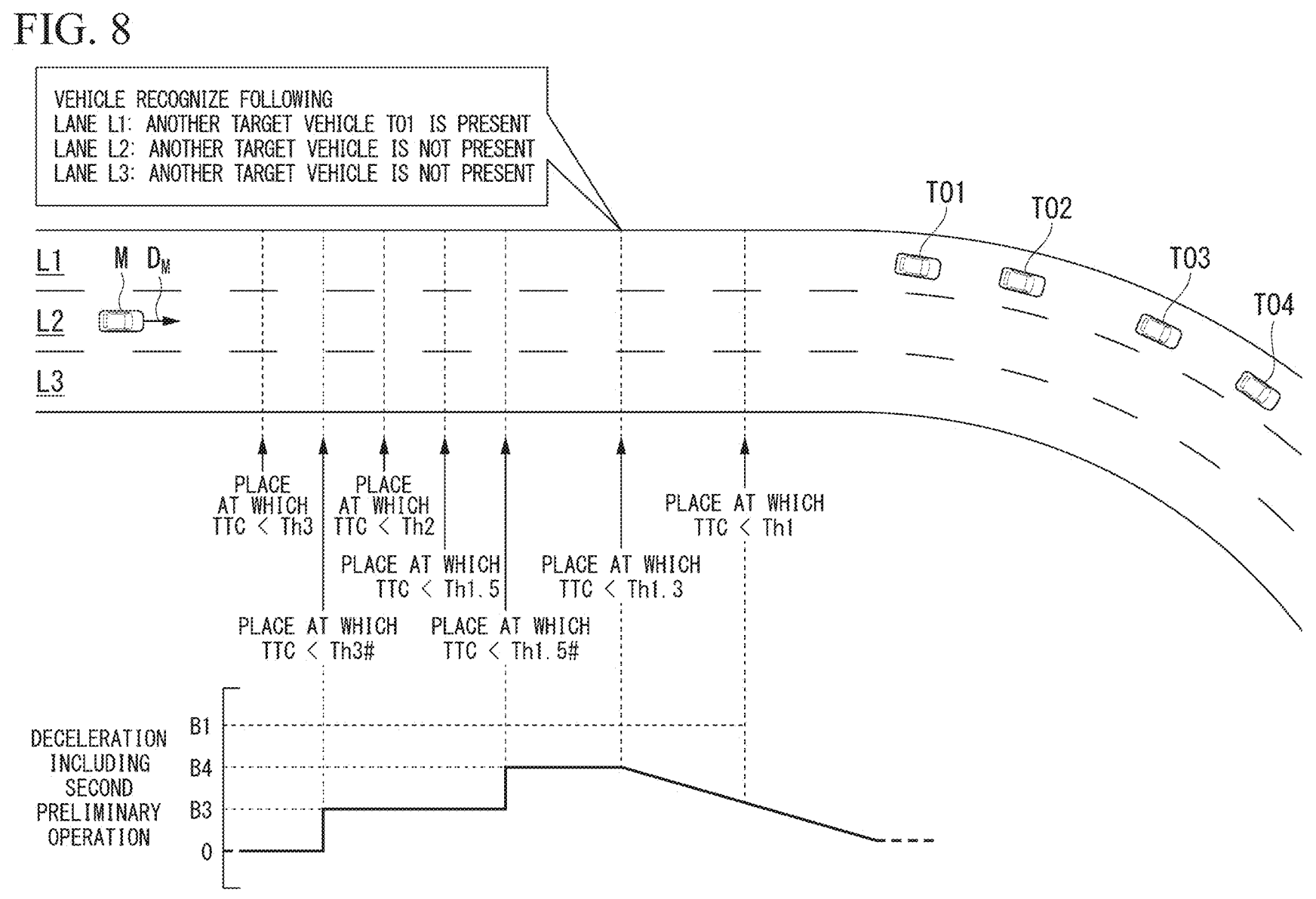

VEHICLE RECOGNIZE FOLLOWING
LANE L1: ANOTHER TARGET VEHICLE T01 IS PRESENT
LANE L2: ANOTHER TARGET VEHICLE IS NOT PRESENT
LANE L3: ANOTHER TARGET VEHICLE IS NOT PRESENT

L1

L2   M   $D_M$

L3

T01   T02   T03   T04

PLACE
AT WHICH
TTC < Th3

PLACE
AT WHICH
TTC < Th3#

PLACE AT WHICH
TTC < Th2

PLACE AT WHICH
TTC < Th1.5

PLACE AT WHICH
TTC < Th1.5#

PLACE AT WHICH
TTC < Th1.3

PLACE AT WHICH
TTC < Th1

DECELERATION
INCLUDING
SECOND
PRELIMINARY
OPERATION

Figure 9:
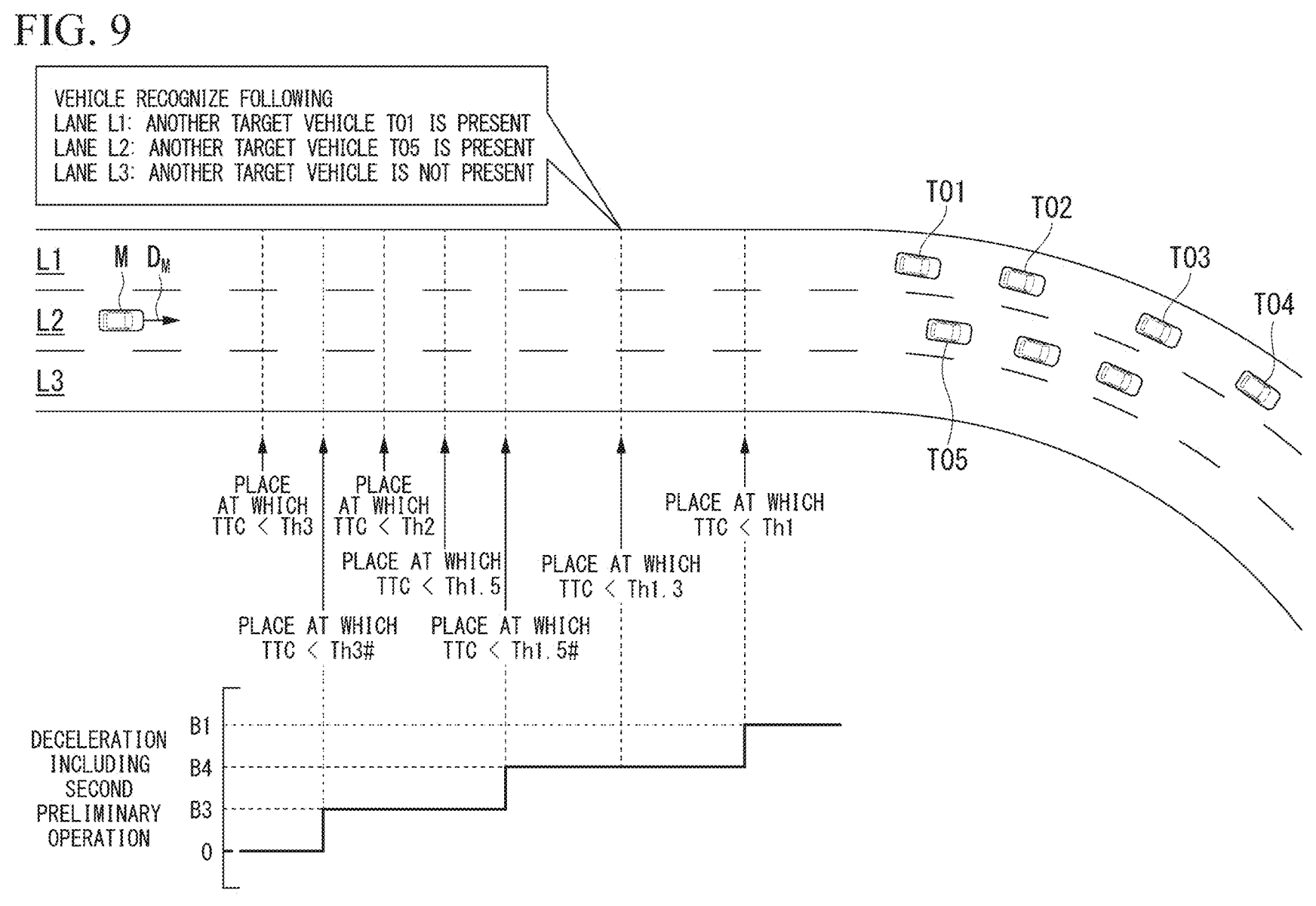

VEHICLE RECOGNIZE FOLLOWING
LANE L1: ANOTHER TARGET VEHICLE TO1 IS PRESENT
LANE L2: ANOTHER TARGET VEHICLE TO5 IS PRESENT
LANE L3: ANOTHER TARGET VEHICLE IS NOT PRESENT

TO4

TO3

TO2

TO1

TO5

L1

L2

M  D_M

L3

PLACE AT WHICH
TTC < Th1

PLACE AT WHICH
TTC < Th1.3

PLACE AT WHICH
TTC < Th1.5#

PLACE AT WHICH
TTC < Th1.5

PLACE
AT WHICH
TTC < Th2

PLACE AT WHICH
TTC < Th3#

PLACE
AT WHICH
TTC < Th3

DECELERATION
INCLUDING
SECOND
PRELIMINARY
OPERATION

| LINK ID | SHAPE OF ROAD |
|---------|---------------|
| 001 | CURVED ROAD THAT IS TARGET FOR CONTROL ACCORDING TO THIS EMBODIMENT |
| 002 | ALTHOUGH ROAD IS CURVED ROAD, IT IS NOT TARGET FOR CONTROL ACCORDING TO THIS EMBODIMENT |
| 003 | STRAIGHT LINE |
| ⋮ | ⋮ |

| LINK ID | CURVATURE | |
|---------|-----------|---|
| 011 | LARGE (GENTLE CURVE) | → CONTROL ACCORDING TO THIS EMBODIMENT IS NOT EXECUTED |
| 012 | INTERMEDIATE | → DEGREE OF RESTRICTING 1 |
| 013 | SMALL (SHARP CURVE) | → DEGREE OF RESTRICTING 2 |
| ⋮ | ⋮ | |

DRIVING ASSISTANCE DEVICE, DRIVING ASSISTANCE METHOD, AND PROGRAM

TECHNICAL FIELD

The present invention relates to a driving assistance device, a driving assistance method, and a program.

BACKGROUND ART

In recent years, inventions of vehicle control devices performing automatic deceleration control and automatic steering control have been disclosed (for example, see Patent Document 1).

CITATION LIST

Patent Document

Patent Document 1: Japanese Unexamined Patent Application, First Publication No. 2020-50010

SUMMARY OF INVENTION

Technical Problem

In a vehicle capable of performing automatic steering control in addition to automatic deceleration control, a likelihood of quickly responding to even a sudden change of a surrounding environment of the vehicle becomes high, and thus a control margin relatively becomes high. On the other hand, in a case in which there is no avoidance space on the lateral side of a target object, it is difficult to perform automatic steering control, and thus the control margin has no change from that of a vehicle performing only automatic deceleration control. In a conventional technology, there are cases in which an operation according to a difference in such an environment cannot be performed.

The present invention is in consideration of such situations, and one object thereof is to provide a driving assistance device, a driving assistance method, and a program capable of performing an appropriate preliminary operation according to a surrounding situation of a target object.

Solution to Problem

A driving assistance device, a driving assistance method, and a program according to the present invention employ the following configurations.

(1): According to one aspect of the present invention, there is provided a driving assistance device including: a controller configured to stop a vehicle by giving an instruction to a brake device of the vehicle in a case in which the degree of approach between a target object among objects and the vehicle satisfies a first condition by referring to an output of a detection device detecting presence of the objects that are present in front of the vehicle; and a steering avoidance controller configured to instruct a steering device of the vehicle to avoid contact with the target object using steering, in which the controller restricts a preliminary operation performed in a case in which the target object is present on a curved road more than a preliminary operation performed in a case in which the target object is not present on the curved road; and the preliminary operation is executed in a case in which the degree of approach between the vehicle and the target object is lower than the first condition.

(2): In the aspect (1) described above, the restricting of the preliminary operation is delaying a timing at which the preliminary operation is performed.

(3): In the aspect (2) described above, the preliminary operation is an operation of raising a deceleration level of the vehicle or an operation of giving a notification to a driver of the vehicle.

(4): In the aspect (1) described above, the preliminary operation is an operation of raising a deceleration level of the vehicle, and the restricting of the preliminary operation is restricting the degree of raising of the deceleration level more than the degree of raising of the deceleration level performed in a case in which the target object is not present on a curved road.

(5): In the aspect (1) described above, the preliminary operation is an operation of giving a notification to the driver of the vehicle, and the restricting of the preliminary operation is restricting the degree of the notification more than the degree of the notification performed in a case in which the target object is not present on a curved road.

(6): In the aspect (1) described above, a recognizer recognizing objects by referring to an output of the detection device that recognizes the curved road by referring to the output of the detection device, or the controller recognizes the curved road by referring to information included in map information.

(7): In the aspect (1) described above, the controller determines the degree of the restricting of the preliminary operation in accordance with a curvature of a curve of the curved road.

(8): In the aspect (1) described above, the controller: restricts the preliminary operation in a case in which the curved road includes a plurality of lanes; and does not restrict the preliminary operation in a case in which the curved road does not include the plurality of lanes.

(9): In the aspect (1) described above, a recognizer configured to recognize objects by referring to the output of the detection device is further included, in which the recognizer executes a process of repeatedly recognizing an object present on the curved road after it is determined that the target object recognized by the recognizer is present on a curved road, and the controller cancels the preliminary operation in a case in which it is determined that the object is not present in a lane in which the vehicle is traveling among a plurality of lanes included in the curved road on the basis of a result of the recognition acquired by the recognizer; and releases the restriction of the preliminary operation in a case in which it is determined that the object is present in the lane in which the vehicle is traveling among the plurality of lanes included in the curved road on the basis of the result of the recognition acquired by the recognizer.

(10): In any one of the aspects (1) to (9) described above, in a case in which the target object is not present on a curved road, the controller performs the preliminary operation in a case in which it is determined that the degree of approach satisfies a predetermined condition that is lower than the first condition, and travelable space after the avoidance using the steering is not present on any of traveling roads of a lateral side of the target object at a time point at which the predetermined condition is satisfied.

(11): In any one of the aspects (1) to (9) described above, the driving assistance device further includes: a first preliminary operation controller configured to perform a first preliminary operation in a case in which the degree of approach satisfies a second condition in a case in which the target object is not present on a curved road; and a second preliminary operation controller configured to perform a second preliminary operation in a case in which it is determined that the degree of approach satisfies a third condition, and travelable space after the avoidance using the steering is not present on any of traveling roads of the lateral side of the target object at a time point at which the third condition is satisfied in a case in which the target object is not present on a curved road, in which the first condition is a condition that is satisfied in a case in which the degree of approach is higher than that of the second condition, the second condition is a condition that is satisfied in a case in which the degree of approach is higher than that of the third condition, and the second preliminary operation is an operation starting at a timing earlier than the first preliminary operation.

(12): According to another aspect of the present invention, there is provided a driving assistance method using a driving assistance device, the driving assistance method including: stopping a vehicle by giving an instruction to a brake device of the vehicle in a case in which the degree of approach between a target object among objects and the vehicle satisfies a first condition by referring to an output of a detection device detecting presence of the objects that are present in front of the vehicle; instructing a steering device of the vehicle to avoid contact with the target object using steering; and restricting a preliminary operation performed in a case in which the target object is present on a curved road more than a preliminary operation performed in a case in which the target object is not present on the curved road, in which the preliminary operation is executed in a case in which the degree of approach between the vehicle and the target object is lower than the first condition.

(13): According to another aspect of the present invention, there is provided a program causing a computer to execute: a process of stopping a vehicle by instructing a brake device of the vehicle in a case in which the degree of approach between a target object among objects and the vehicle satisfies a first condition by referring to an output of a detection device detecting presence of the objects that are present in front of the vehicle; and a process of instructing a steering device of the vehicle to avoid contact with the target object using steering; and a process of restricting a preliminary operation performed in a case in which the target object is present on a curved road more than a preliminary operation performed in a case in which the target object is not present on the curved road, in which the preliminary operation is executed in a case in which the degree of approach between the vehicle and the target object is lower than the first condition.

Advantageous Effects of Invention

According to the aspects described above, a preliminary operation that is appropriate for a surrounding situation of a target object can be performed.

BRIEF DESCRIPTION OF DRAWINGS

FIG. 3 A is a diagram showing one example of an operation view of a steering avoidance controller.

FIG. 8 A diagram (1) showing Restriction Technique 1.

FIG. 9 A diagram (2) showing Restriction Technique 1.

FIG. 11 A diagram (2) showing Restriction Technique 2.

FIG. 12 A diagram showing one example of information 140 of curved roads included in map information.

FIG. 13 A diagram showing one example of information 140 # of curved roads included in map information.

DESCRIPTION OF EMBODIMENTS

Hereinafter, a driving assistance device, a driving assistance method, and a program according to an embodiment of the present invention will be described with reference to the drawings.

Entire Configuration

Figure 1:
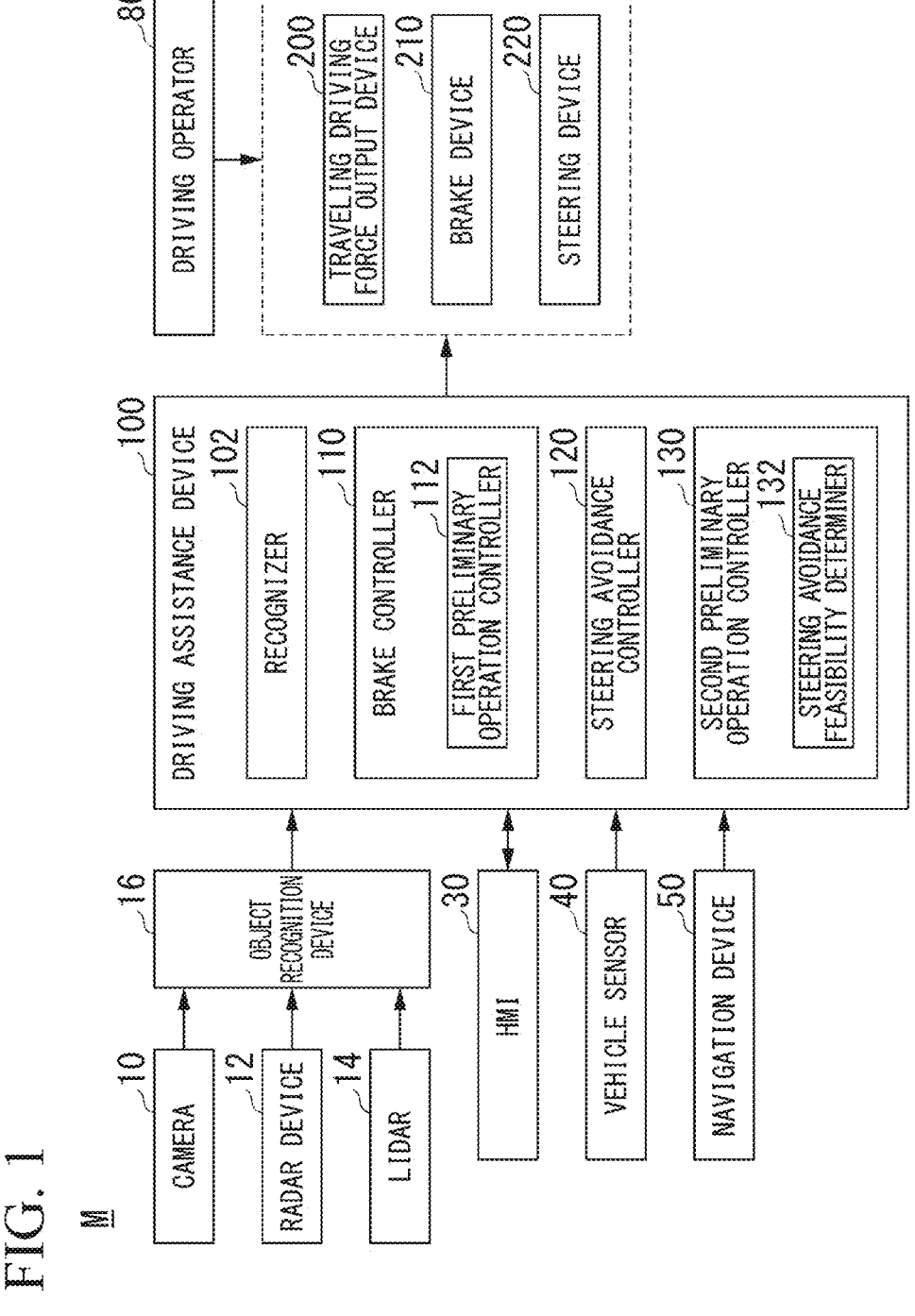
FIG. 1 A configuration diagram of a vehicle in which a driving assistance device according to an embodiment is mounted.

FIG. 1 is a configuration diagram of a vehicle M in which a driving assistance device 100 according to an embodiment is mounted. A vehicle M is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

For example, in the vehicle M, a camera 10, a radar device 12, a light detection and ranging (LIDAR) 14, an object recognition device 16, a human machine interface (HMI) 30, a vehicle sensor 40, a navigation device 50, a driving operator 80, a driving assistance device 100, a traveling driving force output device 200, a brake device 210, and a steering device 220 are mounted. Such devices and units are mutually connected using a multiplexing communication line such as a controller area network (CAN) communication line, a serial communication line, a radio communication network, or the like. The configuration shown in FIG. 1 is merely an example, and a part of the configuration may be omitted, and an additional configuration may be further added.

The camera 10, for example, is a digital camera using a solid-state imaging device such as a charge coupled device (CCD) or a complementary metal oxide semiconductor (CMOS). The camera 10 is installed at an arbitrary place in a vehicle (hereinafter, a vehicle M) in which the vehicle system 1 is mounted. In a case in which a side in front is to be imaged, the camera 10 is attached to an upper part of a front windshield, a rear face of a room mirror, or the like. The camera 10, for example, periodically images the vicinity of the vehicle M repeatedly. The camera 10 may be a stereo camera.

The radar device 12 emits radio waves such as millimeter waves to the vicinity of the vehicle M and determines at least a position of (a distance and an azimuth) an object by detecting radio waves (reflected waves) reflected by the object. The radar device 12 is installed at an arbitrary place on the vehicle M. The radar device 12 may determine a position and a speed of an object using a frequency modulated continuous wave (FM-CW) system.

The LIDAR 14 emits light (or a radiowave having a wavelength close to light) to the vicinity of the vehicle M and measures scattered light. The LIDAR 14 determines a distance to a target on the basis of a time from light emission to light reception. For example, the emitted light is pulse-shaped laser light. The LIDAR 14 is attached to an arbitrary place in the vehicle M.

The object recognition device 16 performs a sensor fusion process for detection results acquired using some or all of the camera 10, the radar device 12, and the LIDARs 14, thereby recognizing a position, a type, a speed, and the like of an object. The object recognition device 16 recognizes the shape of the road, road markings, the boundaries of the road, and the like. The object recognition device 16 outputs results of the recognition to the driving assistance device 100. The object recognition device 16 may directly output detection results acquired by the camera 10, the radar device 12, and the LIDAR 14 to the driving assistance device 100. The object recognition device 16 may be omitted from the vehicle system 1.

Some or all of the camera 10, the radar device 12, the LIDAR 14, and the object recognition device 16 are examples of "detection devices."

The HMI 30 presents various types of information to an occupant of the vehicle M and receives an input operation performed by the occupant. The HMI 30 includes various display devices, a speaker, a buzzer, a vibration generation device (a vibrator), a touch panel, switches, keys, and the like.

The vehicle sensor 40 includes a vehicle speed sensor that determines a speed of the vehicle M, an acceleration sensor that detects an acceleration, a yaw rate sensor that determines an angular velocity around a vertical axis, an azimuth sensor that determines the azimuth of the vehicle M, and the like.

The navigation device 50, for example, includes a global navigation satellite system (GNSS) receiver, a guide controller, a storage in which map information is stored, and the like. The GNSS receiver identifies a position of the vehicle M on the basis of signals received from GNSS satellites. The position of the vehicle M may be identified or complemented using an inertial navigation system (INS) that uses the output of the vehicle sensor 40. The guide controller, for example, determines a path to a destination input by an occupant from the position of the vehicle M identified by the GNSS receiver (or an arbitrary position that has been input) by referring to map information and causes the HMI 30 to output guide information such that the vehicle M travels along the path. The map information, for example, is information in which a road form is represented using respective links representing roads and respective nodes connected using the links. The map information may include a curvature of each road, point of interest (POI) information, and the like. The navigation device 50 may transmit a current position and a destination of the vehicle M to a navigation server through a communication device and acquire a path from the navigation server.

The driving operator 80, for example, includes an acceleration pedal, a brake pedal, a steering wheel, a shift lever, and other operators. A sensor determining the amount of an operation or the presence/absence of an operation is installed in the driving operator 80, and a result of determination thereof is output to some or all of the traveling driving force output device 200, the brake device 210, and the steering device 220.

The traveling driving force output device 200 outputs a traveling driving force (torque) for enabling the vehicle to travel to driving wheels. The traveling driving force output device 200, for example, includes a combination of an internal combustion engine, an electric motor, and a transmission, and an electronic control unit (ECU) controlling these. The ECU controls the components described above in accordance with information input from the driving assistance device 100 or information input from the driving operator 80.

The brake device 210, for example, includes a brake caliper, a cylinder that delivers hydraulic pressure to the brake caliper, an electric motor that generates hydraulic pressure in the cylinder, and an ECU. The ECU performs control of the electric motor in accordance with information input from the driving assistance device 100 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the driving assistance device 100.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the driving assistance device 100 or information input from the driving operator 80.

Driving Assistance Device

The driving assistance device 100, for example, includes a recognizer 102, a brake controller 110, a steering avoidance controller 120, and a second preliminary operation controller 130. The brake controller 110 includes a first preliminary operation controller 112, and the second preliminary operation controller 130 includes a steering avoidance feasibility determiner 132. Such a functional member, for example, is realized by a hardware processor such as a central processing unit (CPU) executing a program (software). Some or all of such constituent elements may be realized by hardware (a circuit; includes circuitry) such as a large-scale integration (LSI), an application specific integrated circuit (ASIC), a field-programmable gate array (FPGA), a graphics processing unit (GPU), or the like or may be realized by software and hardware in cooperation. The program may be stored in a storage device (a storage device including a non-transitory storage medium) such as an HDD, a flash memory, or the like of the driving assistance device 100 in advance or may be stored in a storage medium such as a DVD or a CD-ROM that can be loaded or unloaded and installed in the HDD or the flash memory of the driving assistance device 100 by loading the storage medium (a non-transitory storage medium) into a drive device. The functional member described above may be integrated with another functional member. For example, the recognizer 102 may be included in each of the brake controller 110, the steering avoidance controller 120, and the second preliminary operation controller 130. The brake controller 110, the steering avoidance controller 120, and the second preliminary operation controller 130 may be integrated together. The second preliminary operation controller 130 is one example of a "controller." The brake controller 110 is another example of a "controller."

Instructions from the driving assistance device 100 to the traveling driving force output device 200, the brake device 210, and the steering device 220 are set inside of the traveling driving force output device 200, the brake device 210, and the steering device 220 such that the instructions are executed with priority over a determination result from the driving operator 80. Regarding braking, in a case in which a braking force based on an amount of operation of the brake pedal is larger than that of the instruction from the driving assistance device 100, the braking force described above may be set to be executed with priority. In addition, as a mechanism for executing an instruction from the driving assistance device 100 with priority, a communication priority in an in-vehicle LAN may be used.

Figure 2:
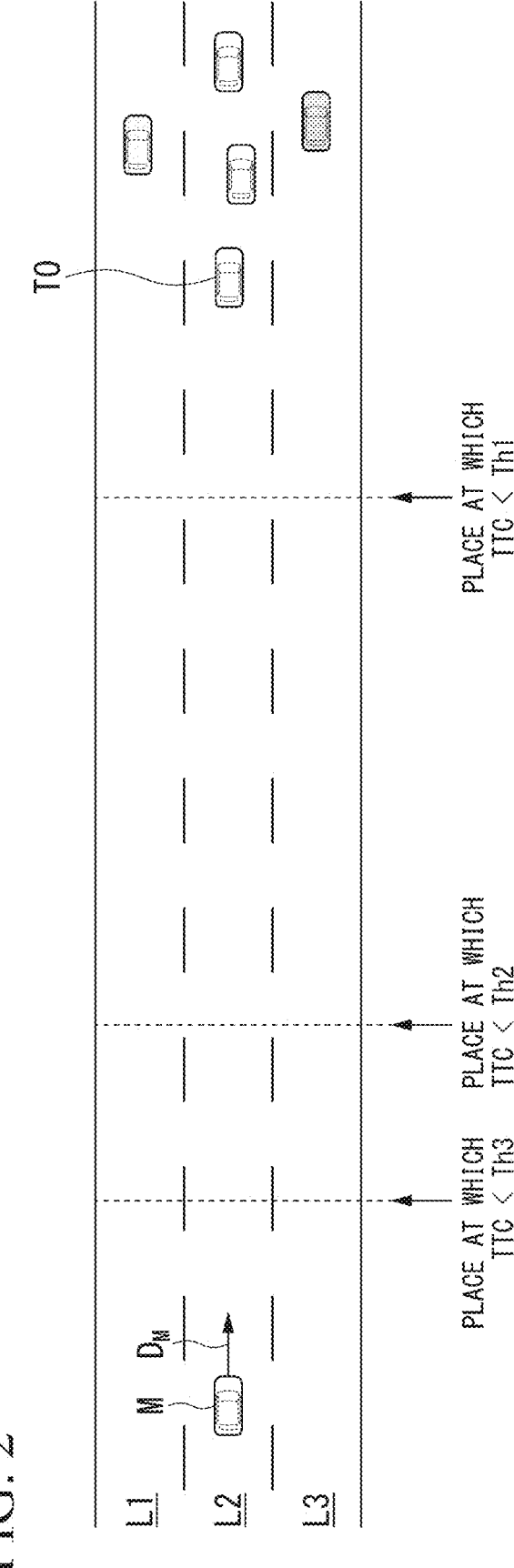
FIG. 2 A diagram showing an overview of functions of a driving assistance device.

FIG. 2 is a diagram showing an overview of functions of the driving assistance device 100. Hereinafter, each part of the driving assistance device 100 will be described with reference to this drawing and FIG. 1. In FIG. 2, a vehicle M is traveling on a three-lane road and is in a lane L2 at the center thereof. A travel direction $D_M$ of the vehicle M is shown.

The recognizer 102 recognizes objects by referring to an output of a detection device (described above) that detects presence of objects present in front of the vehicle M. The recognizer 102 recognizes the shape of the road ahead, road markings, road boundaries, and the like by referring to the output of the detection device. The recognizer 102 identifies a lane in which an object is present on the basis of the position of the object, the positions of the road markings, and the positions of the road boundaries.

The brake controller 110 refers to an output of the detection device (described above) detecting presence of objects present in front of the vehicle M (refers to a recognition result acquired by the recognizer 102), and in a case in which the degree of approach between a target object TO among objects and the vehicle M satisfies a first condition, instructs the brake device 210 and/or the traveling driving force output device 200 to decelerate and stop the vehicle M. The target object TO is an object that is present on the same traveling road as the vehicle M and is present on the traveling-direction side of the vehicle M and is an object of which contact with the vehicle M needs to be avoided, not an object such as a manhole or the like that can be driven over. The brake controller 110 extracts such an object and sets the extracted object as a target object TO. In the example shown in FIG. 2, another vehicle present at the conventional end is set as the target object TO. The traveling road, for example, is a lane and may be a virtual lane that is virtually set by the vehicle M on a road surface on which road markings are not present. This similarly applies throughout the following description.

A "degree of approach" is represented using various index values representing the degree of approach between objects. For example, the "degree of approach" is a time to collision (TTC) that is an index value acquired by dividing a distance by a relative speed (a direction of mutual approach is set as positive). In addition, in a case in which the relative speed is negative (a direction away from each other), the TTC is hypothetically set to infinity. The TTC is an index value that represents a higher "degree of approach" the less the value is. The satisfying of the "first condition," for example, is the TTC being less than a first threshold Th1. The first threshold Th1, for example, is a value of approximately a few tenths of a second. Instead of the TTC, an index value having a similar property, for example, a headway time and a distance or any other index value may be used as the "degree of approach." In addition, a TTC that has been adjusted with acceleration or jerk taken into account may be used as the "degree of approach." In the following description, the "degree of approach" will be described as being the TTC.

In a case in which the TTC is less than the first threshold Th1, the brake controller 110 instructs the brake device 210 and/or the traveling driving force output device 200, for example, to output a braking force decelerating the vehicle M with a first deceleration B1. The first deceleration B1 is, for example, a deceleration of about a few tenths [G] (close to 1). In accordance with this, the brake controller 110 quickly decelerates the vehicle M to stop, thereby avoiding contact with the target object TO. A function of acquiring a brake output, an amount of regenerative control, an engine brake amount, and the like on the basis of an instructed deceleration is included in an ECU of the brake device 210 or the traveling driving force output device 200, and the ECU determines each control amount on the basis of the instructed deceleration and the speed of the vehicle M. This is a well-known technology, and a detailed description thereof will be omitted.

The operation of the first preliminary operation controller 112 will be described below, and first, the steering avoidance controller 120 will be described.

Figure 3:
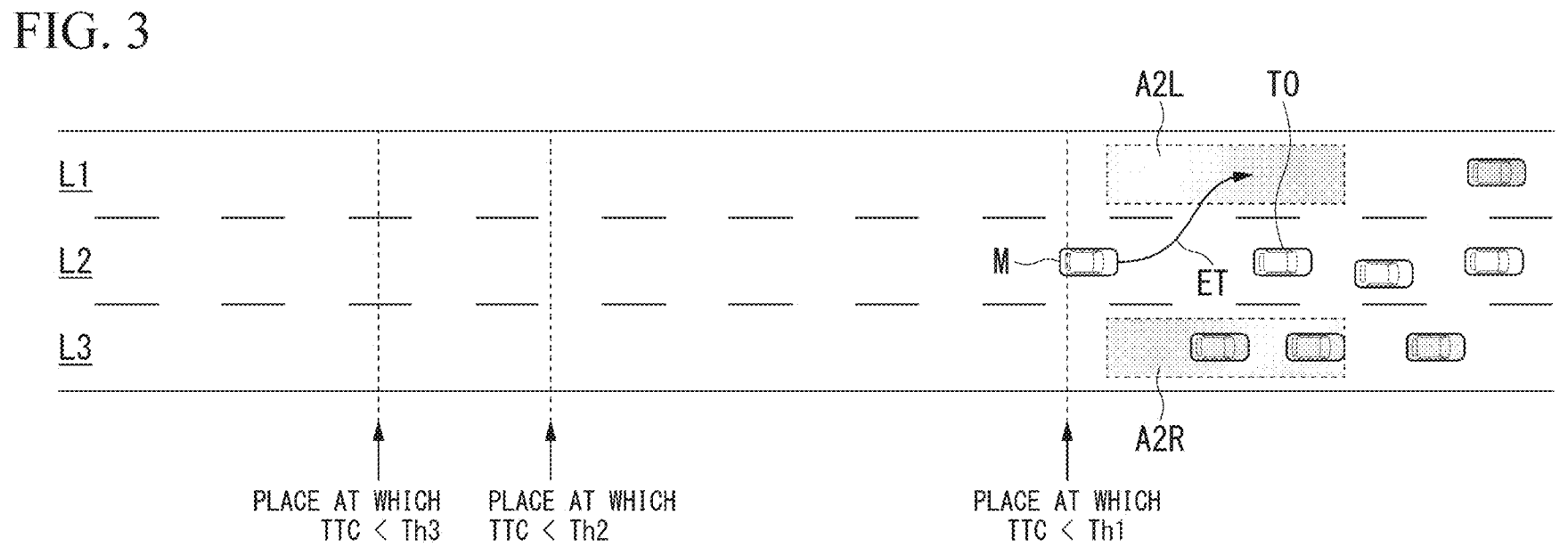

FIG. 3 is a diagram showing one example of an operation view of the steering avoidance controller 120. In a case in which the brake controller 110 determines that it is difficult to stop the vehicle M before the target object TO, the steering avoidance controller 120 determines whether or not space in which the vehicle M can travel is present on a traveling road (for example, a lane L1 or L2) of the lateral side of the target object TO, and in a case in which it is determined that such space is present, generates an avoidance trajectory ET and instructs the steering device 220 such that the vehicle M travels along the avoidance trajectory ET (steering avoidance). For example, as the areas A2L and A2R shown in FIG. 3, the steering avoidance controller 120 determines whether or not an object is present inside a lateral-side area extending from slightly before a target vehicle to a rear side on both sides of the target vehicle TO, and in a case in which no object is present, determines that space in which the vehicle M can travel is present on the traveling road of the lateral side of the target object TO. The determination on whether or not it is difficult to stop the vehicle M before the target object TO that is performed by the brake controller 110 may be performed by the brake controller 110 or may be performed by the steering avoidance controller 120. The steering avoidance controller 120, for example, also recognizes the boundaries of the traveling road by recognizing white lines and shoulders in a camera image, and in a case in which one of the areas A2L and A2R that are originally travelable is not present, for example, in a case in which one of the lanes L1 and L3 is not present, may determine that an object is present in this area.

The steering avoidance is executed in situations in which there is a sudden change in the surrounding environment of a vehicle such as when the target object TO decelerates unexpectedly, or when an object other than the recognized target object TO cuts in between the vehicle M and the target object TO and is set as a new target vehicle TO. In such situations, although there is a likelihood of being unable to respond thereto with a deceleration calculated to stop before the target vehicle TO in advance, by having the function of the steering avoidance, a likelihood of being able to respond even to a sudden change in the surrounding environment of the vehicle can be raised.

Preliminary Operation

Figure 4:
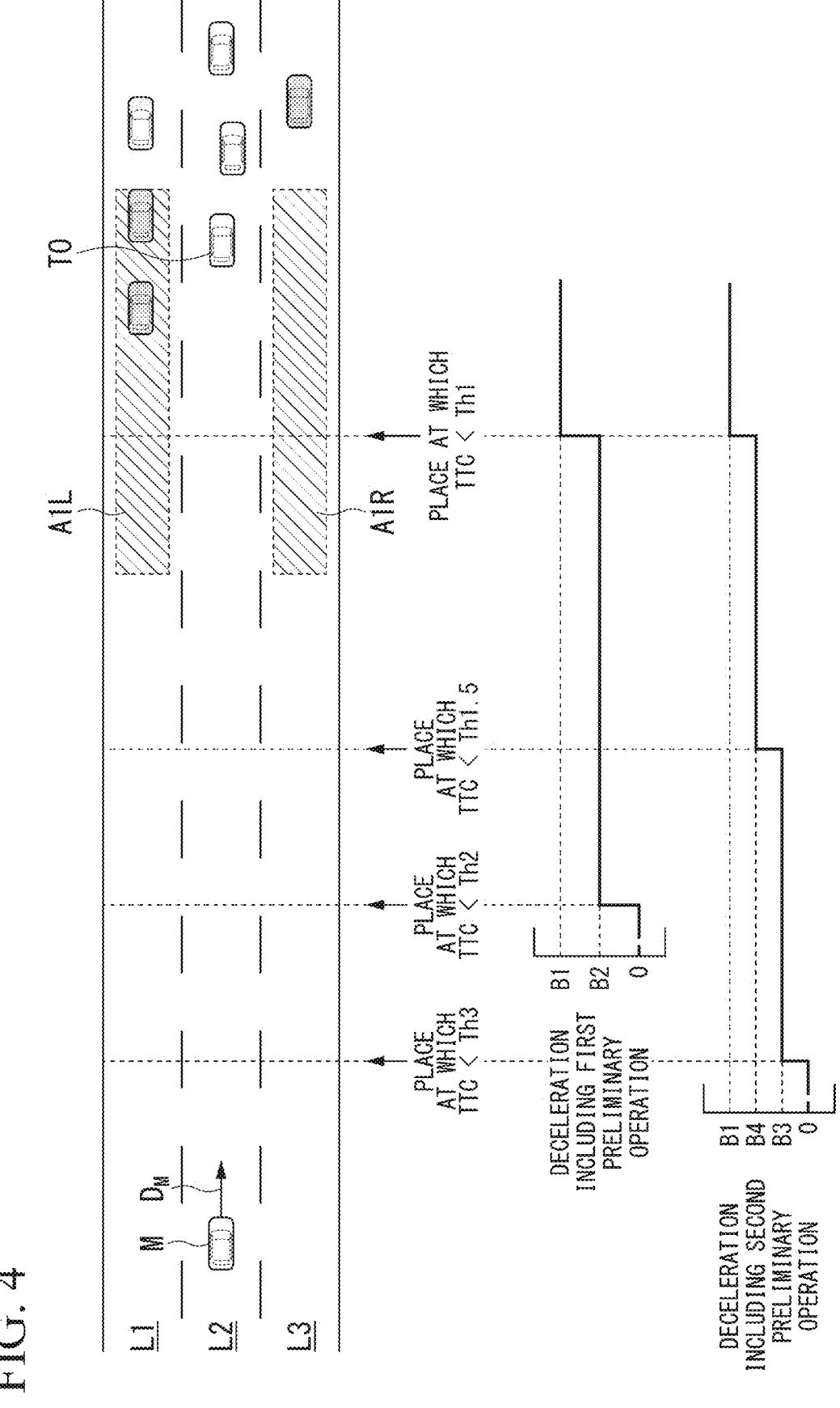
FIG. 4 A diagram showing a preliminary operation.

Hereinafter, processes of the first preliminary operation controller 112 and the second preliminary operation controller 130 will be described. FIG. 4 is a diagram showing a preliminary operation.

In a case in which the degree of approach between a target object TO and the vehicle M satisfies a second condition (for example, in a case in which the TTC is less than a second threshold Th2), the first preliminary operation controller 112 performs a first preliminary operation for informing a driver of the vehicle M about the presence of the target object TO. The first preliminary operation, for example, is an operation of instructing the brake device 210 and/or the traveling driving force output device 200 to output a braking force decelerating the vehicle M with a second deceleration B2 until the TTC becomes less than the first threshold Th1 after it becomes less than the second threshold Th2. The second deceleration B2 is a deceleration lower than the first deceleration B1 (close to zero). The second threshold Th2 has a value larger than the first threshold Th1. Thus, the first condition is a condition that is satisfied in a case in which the degree of approach is higher than that of the second condition.

The second preliminary operation controller 130 performs a second preliminary operation to inform the driver of vehicle M about the presence of the target object TO in a case in which the degree of approach between the target object TO and the vehicle M satisfies a third condition (for example, the TTC is less than a third threshold Th3), and it is determined that there is no travelable space after avoidance using steering is performed on any of traveling roads of the lateral side of the target object TO at a time point at which the third condition is satisfied. The determination of travelable space is performed by the steering avoidance feasibility determiner 132. The third threshold Th3 has a value that is larger than the second threshold Th2. Thus, the second condition is a condition that is satisfied in a case in which the degree of approach is higher than that of the third condition.

The steering avoidance feasibility determiner 132, for example, at a time point at which the TTC becomes less than the third threshold Th3, determines whether or not an object is present in a lateral-side area extending from slightly before the target vehicle on both sides of the target vehicle TO over the rear side like the areas A1L and A1R shown in FIG. 4, and in a case in which no object is present, determines that there is space in which the vehicle M can travel on a traveling road of the lateral side of the target object TO. Each of the areas A1L and A1R, for example, is set as an area larger than each of the areas A2L and A2R in consideration of uncertain factors of the future. Similar to the steering avoidance controller 120, the steering avoidance feasibility determiner 132, for example, also recognizes the boundaries of the traveling road by recognizing white lines and shoulders in a camera image, and in a case in which one of the areas A1L and A1R that are originally travelable is not present, for example, in a case in which one of the lanes L1 and L3 is not present, may determine that an object is present in this area. In the example shown in FIG. 4, since no object is present in the area A1R, the steering avoidance feasibility determiner 132 determines that space in which the vehicle M can travel is present on a traveling road of the lateral side of the target object TO.

The second preliminary operation, for example, is an operation instructing the brake device 210 and/or the traveling driving force output device 200 to output a braking force for decelerating the vehicle M with a third deceleration B3, first, until the TTC becomes less than the first threshold Th1 after being less than the third threshold Th3 and thereafter instructing the brake device 210 and/or the traveling driving force output device 200 to output a braking force for decelerating the vehicle M with a fourth deceleration B4. The third deceleration B3, for example, is a deceleration lower than the second deceleration B2 (close to zero), and the fourth deceleration B4 is a level higher or the same as the second deceleration and is a deceleration lower than the first deceleration B1. A timing for switching from the third deceleration B3 to the fourth deceleration B4 may be arbitrarily set. For example, in a case in which the degree of approach between a target object TO and a vehicle M satisfies a 1.5-th condition (for example, in a case in which the TTC is less than threshold Th1.5), switching from the third deceleration B3 to the fourth deceleration B4 can be performed. The 1.5 condition is a condition that is satisfied in a case in which the degree of approach is higher than that of the second condition. In a case in which the second condition is satisfied, switching from the third deceleration B3 to the fourth deceleration B4 may be performed.

In this way, compared to the first preliminary operation, the second preliminary operation is started at an earlier timing and is performed in multiple stages. As described above, in a situation in which steering avoidance can be performed, a likelihood of being able to quickly respond to even a sudden change in the surrounding environment of a vehicle becomes high, and a control margin becomes relatively large. On the other hand, in a case in which there is no avoidance space on the lateral side of the target object, even when the function of steering avoidance is included, it becomes difficult to execute the function, and thus the control margin becomes the same as that of a vehicle that is capable of performing only automatic stop. In other words, in a situation in which it is difficult to perform steering avoidance, compared to a situation in which steering avoidance can be performed, it is preferable to alert the driver of the vehicle M more quickly and effectively. According to this embodiment, compared to the first preliminary operation, by starting the second preliminary operation at an earlier timing and performing the second preliminary operation in multiple states, an appropriate preliminary operation according to the surrounding situation of a target object can be performed.

Figure 5:
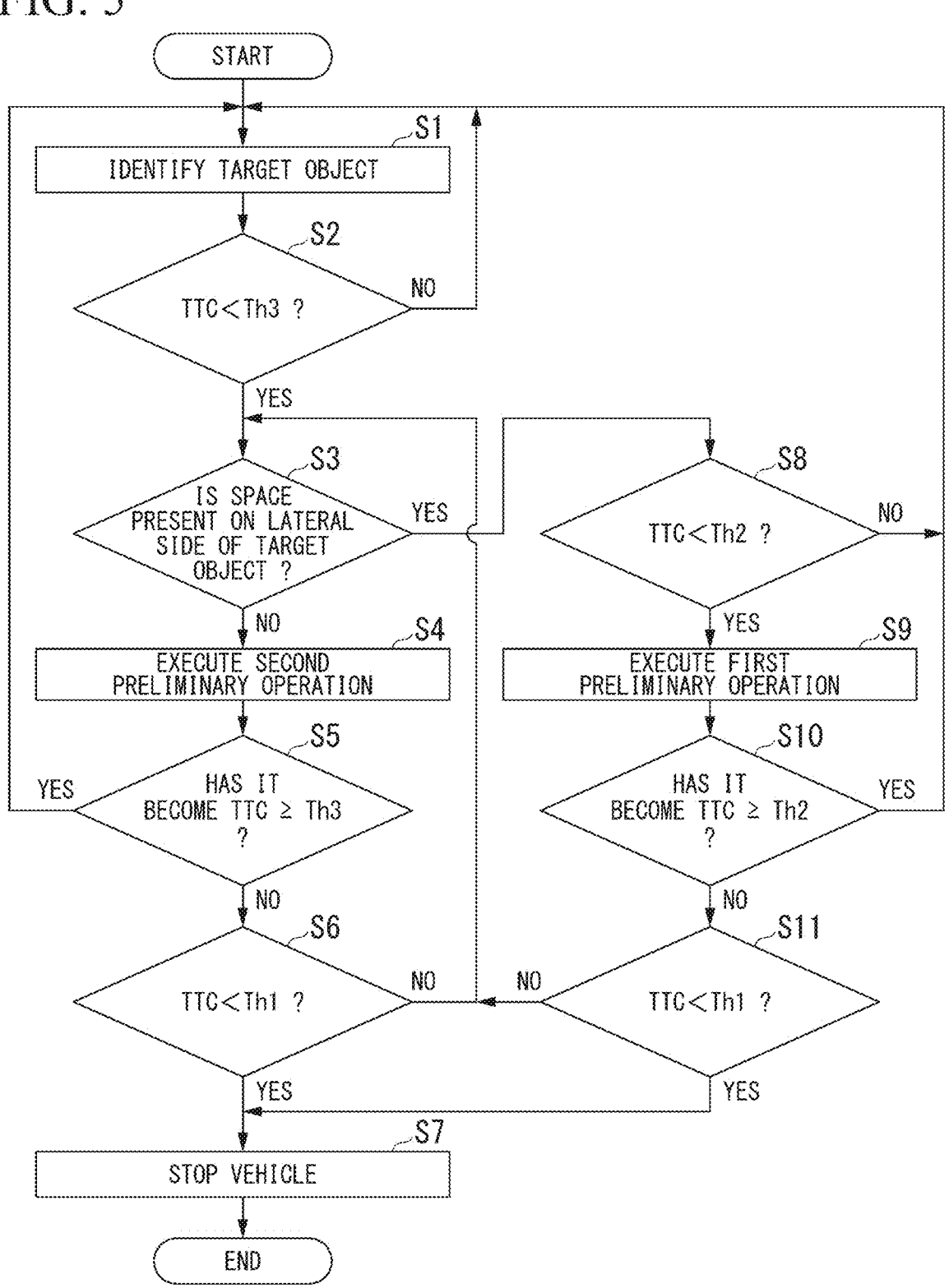
FIG. 5 A flowchart showing one example of the flow of a process executed by a driving assistance device.

FIG. 5 is a flowchart showing one example of the flow of a process executed by the driving assistance device 100.

First, the brake controller 110 identifies a target object TO (Step S1). Next, the second preliminary operation controller 130 determines whether or not a TTC between a vehicle M and the target object TO is less than the third threshold Th3 (Step S2). In a case in which the TTC between the vehicle M and the target object TO is the third threshold Th3 or more, the process is caused to return to Step S1.

In a case in which it is determined that the TTC between the vehicle M and the target object TO is less than the third threshold Th3, the steering avoidance feasibility determiner 132 of the second preliminary operation controller 130 determines whether or not space in which the vehicle M can travel is present on a traveling road of the lateral side of the target object TO (Step S3).

In a case in which it is determined that no space in which the vehicle M can travel is present on the traveling road of the lateral side of the target object TO, the second preliminary operation controller 130 executes the second preliminary operation (Step S4). Next, the second preliminary operation controller 130 determines whether or not the TTC between the vehicle M and the target object TO has risen and become the third threshold Th3 or more (Step S5). In a case in which it is determined that the TTC between the vehicle M and the target object TO has risen and become the third threshold Th3 or more, the process is caused to return to Step S1.

In a case in which it is not determined that the TTC between the vehicle M and the target object TO has risen and become the third threshold Th3 or more, the brake controller 110 determines whether or not the TTC between the vehicle M and the target object TO is less than the first threshold Th1 (Step S6). In a case in which it is determined that the TTC between the vehicle M and the target object TO is the first threshold Th1 or more, the process is caused to return to Step S3. In a case in which Yes is determined in Step S3, the second preliminary operation is stopped, and processes of Step S8 and subsequent steps are executed. In a case in which it is determined that the TTC between the vehicle M and the target object TO is less than the first threshold Th1, the brake controller 110 causes the brake device 210 and/or the traveling driving force output device 200 to output a braking force decelerating the vehicle M with the first deceleration B1 to decelerate and stop the vehicle M (Step S7). At this time, as described above, instead of (or in addition to) stopping the vehicle M through deceleration, steering avoidance may be performed.

In a case in which Yes is determined in Step S3, in other words, in a case in which the TTC between the vehicle M and the target object TO is less than the third threshold Th3, and space in which the vehicle M can travel is present on the traveling road of the lateral side of the target object TO, the first preliminary operation controller 112 of the brake controller 110 determines whether or not the TTC between the vehicle M and the target object TO is less than the second threshold Th2 (Step S8). In a case in which it is determined that the TTC between the vehicle M and the target object TO is the second threshold Th2 or more, the process is caused to return to Step S1.

In a case in which it is determined that the TTC between the vehicle M and the target object TO is less than the second threshold Th2, the first preliminary operation controller 112 executes the first preliminary operation (Step S9). Next, the first preliminary operation controller 112 determines whether or not the TTC between the vehicle M and the target object TO has risen and become the second threshold Th2 or more (Step S10). In a case in which it is determined that the TTC between the vehicle M and the target object TO has risen and become the second threshold Th2 or more, the process is caused to return to Step S1.

In a case in which it is not determined that the TTC between the vehicle M and the target object TO has risen and become the second threshold Th2 or more, the brake controller 110 determines whether or not the TTC between the vehicle M and the target object TO is less than the first threshold Th1 (Step S11). In a case in which it is determined that the TTC between the vehicle M and the target object TO is the first threshold Th1 or more, the process is caused to return to Step S3. In a case in which No is determined in Step S3, the first preliminary operation is stopped, and processes of Step S4 and subsequent steps are executed. In a case in which it is determined that the TTC between the vehicle M and the target object TO is less than the first threshold Th1, the brake controller 110 causes the brake device 210 and/or the traveling driving force output device 200 to output the first deceleration B1 to decelerate and stop the vehicle M (Step S7).

According to the embodiment described above, in a case in which it is determined that the degree of approach between a target object TO and a vehicle M satisfies the third condition, and, at a time point at which the third condition is satisfied, no travelable space is present after avoidance using steering is performed in any one of traveling roads of the lateral side of the target object TO, by performing the second preliminary operation starting at a timing earlier than that of the first preliminary operation, an appropriate preliminary operation according to a surrounding situation of the target object TO can be performed.

In the embodiment described above, in any one of the first preliminary operation and the second preliminary operation, instead of output of a braking force, a display, a voice output, a vibration output, or the like for an alert (a notification) may be performed. In this case, as an example in which the second preliminary operation is performed in multiple stages, instead of outputting a braking force in a stepped manner while changing the degree of deceleration as described above, configuring visibilities (contrast, luminance, hue, and the like) of an initial display screen and display screens of the second time and subsequent times to be different from each other, configuring details or volumes of an initial voice output and voice outputs of the second time and subsequent times to be different from each other, configuring vibration outputs of the second time and subsequent times to be larger than an initial vibration output, and the like can be performed.

In the embodiment described above, in a case in which a branch road to a destination set in the navigation device 50 is present on one of left and right sides of a lane in which the vehicle M is traveling, lane change may be forcibly performed in the middle of the preliminary operation. In such a case, consequently, the vehicle M can be moved in a direction for approaching the destination and be guided to a state in which an object that becomes a target object is not present near the vehicle M.

In the example described above, control of a case in which the vehicle M is traveling on a road different from a specific road has been described. In a case in which the vehicle M is traveling on a specific road, control different from the control of a case in which it is traveling on the different road described above may be performed. The specific road, for example, is a road of a shape such as a curved road for which a position of another vehicle present on the front side with respect to a lane cannot be determined. The different road described above is a road different from a curved road such as a straight road. The different control described above is control of restricting the second preliminary operation (a preliminary operation). Hereinafter, a curved road will be described as one example.

Control of Case of Entering Curve

Figure 6:
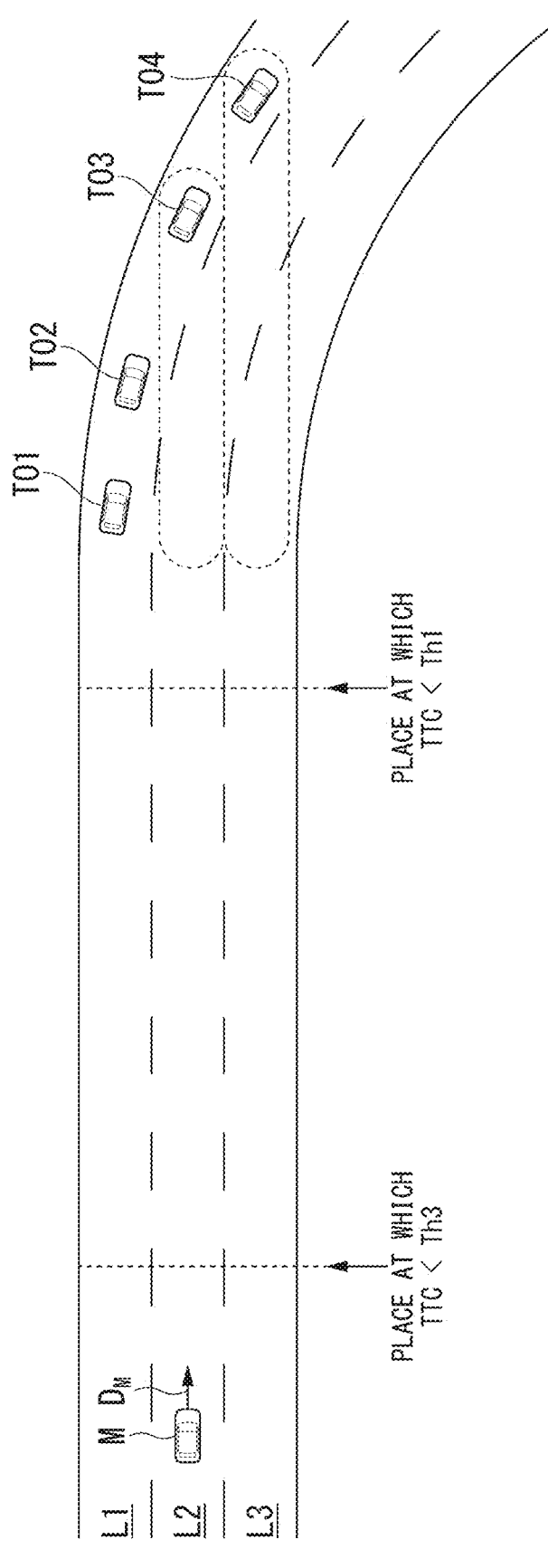
FIG. 6 A diagram showing a curved road.
Figure 7:
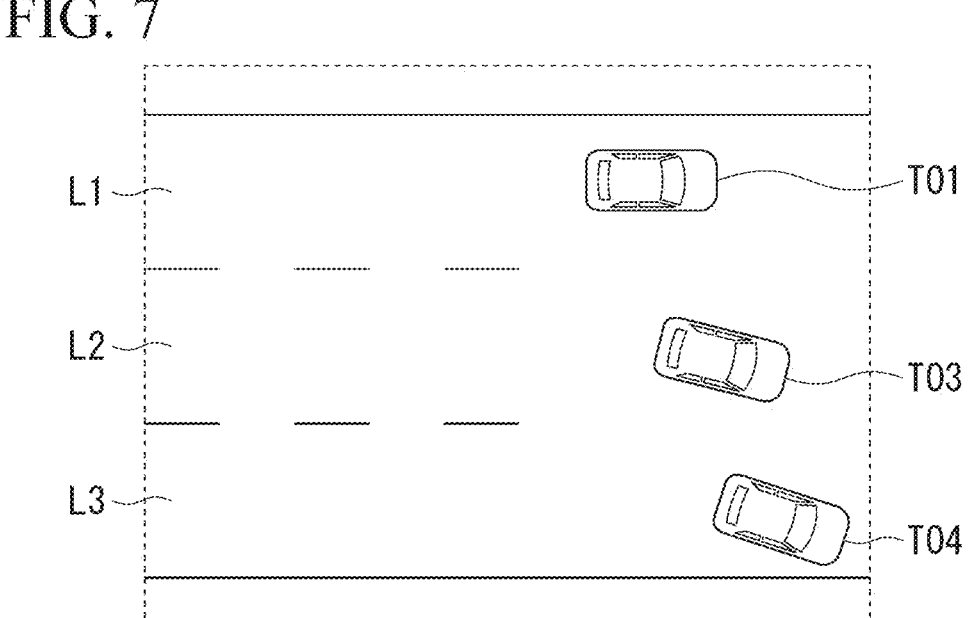
FIG. 7 A diagram showing one example of a recognition result acquired by a recognizer 102.

FIG. 6 is a diagram showing a curved road. In a lane L1 of a curved road, for example, a plurality of target objects TO1 to TO4 (in a case in which they do not need to be distinguished from each other, they may be referred to as "target object") are present. For example, other vehicles that are the target objects TO1 to TO4 are stopping in order from a side closer to the vehicle M (a start point of the curved road). In a case in which the recognizer 102 recognizes a target object, there are cases in which the position of the target object with respect to a lane cannot be recognized. The reason for this is that, in a case in which the front side is viewed from the vehicle M, there are cases in which a target object is seen as if it is present in another lane due to the curve of the road. For example, since the target object TO3 is present at a position acquired by extending a lane L2 in the traveling direction, and the target object TO4 is present at a position acquired by extending a lane L3 in the traveling direction, there are cases in which the target objects are recognized to travel side by side as in FIG. 7. FIG. 7 shows a case in which target objects are viewed from above.

FIG. 7 is a diagram showing one example of a recognition result acquired by the recognizer 102. As described above, the recognizer 102 recognizes that a target object TO3 is present in a lane L2, and a target object TO4 is present in a lane L3. The recognizer 102 may derive a recognition result of being unable to recognize lanes in which the target object TO3 and the target object TO4 are present or the reliability of recognition being equal to or less than a threshold. The reliability being equal to or less than a threshold represents that conditions set in advance are satisfied in an algorithm of the recognizer 102 recognizing a position of a target object with respect to a lane or that, in a case in which a recognition result is evaluated using a predetermined evaluation function, the evaluation is a predetermined value or less. In this way, in a case in which a target object is present on a curved road, there are cases in which the recognizer 102 cannot recognize a lane in which the target object is present. In consideration of such a situation, the following control is performed.

The second preliminary operation controller 130 restricts a preliminary operation (a second preliminary operation) performed in a case in which a target object recognized by the recognizer 102 is present on a curved road more than a preliminary operation performed in a case in which a target object (target object) recognized by the recognizer 102 is not present on a curved road. A preliminary operation is executed in a case in which the degree of approach between the vehicle M and the target object is lower than that of the first condition. A preliminary operation includes one or both of an operation of increasing the degree of deceleration of the vehicle M and an operation of giving a notification to a driver of the vehicle M (described above).

The restriction includes one or both of Restriction Technique 1 and Restriction Technique 2. In the Restriction Technique 1, a timing at which a preliminary operation is performed is delayed. In the Restriction Technique 2, the degree of raising of the deceleration level is restricted more than the degree of raising of the deceleration level that is performed in a case in which a target object recognized by the recognizer 102 is not present on a curved road. In the Restriction Technique 2, the degree of notification may be restricted more than the degree of notification performed in a case in which a target object recognized by the recognizer 102 is not present on a curved road. Hereinafter, such an example will be described.

Restriction Technique 1

FIG. 8 is a diagram (1) showing Restriction Technique 1. In a case in which it is determined that the degree of approach between the target object and the vehicle M satisfies a third condition, a curved road is present, and the target object is present on the front side (on a curved road or near a curved road), the second preliminary operation controller 130 does not execute the second preliminary operation. In a case in which it is determined that the degree of approach between the target object and the vehicle M satisfies a third condition # (for example, the TTC is less than a third threshold Th3#), a curved road is present, and the target object is present on the front side (on a curved road or near a curved road), the second preliminary operation controller 130 executes the second preliminary operation. The third threshold Th3# has a value that is smaller than the third threshold Th3 and is larger than the second threshold Th2. Thus, the third condition # is a condition that is satisfied in a case in which the degree of approach is higher than that of the third condition. A target object at this time may be a target object that is recognized as being present at a closest position for the vehicle M or may be a target object that is recognized as being present in the lane L2.

In a case in which it is determined that the degree of approach between a target object and the vehicle M satisfies a 1.5-th condition, a curved road is present, and the target object is present on the front side (near the curved road), the second preliminary operation controller 130 does not execute the second preliminary operation. In a case in which it is determined that the degree of approach between a target object and the vehicle M satisfies a 1.5-th condition # (for example, the TTC is less than a threshold Th1.5#), a curved road is present, and the target object is present on the front side (near the curved road), the second preliminary operation controller 130 executes the second preliminary operation. The threshold Th1.5# has a value that is smaller than the threshold Th1.5 and is larger than the first threshold Th1. Thus, the 1.5 condition # is a condition that is satisfied in a case in which the degree of approach is higher than that of the 1.5 condition.

After the degree of approach between the target object and the vehicle M satisfies the 1.5 condition # (for example, after the TTC becomes less than the threshold Th1.5#), in a case in which it is determined that a curved road is present, and no target object is present in the lane L2 in which the vehicle M is traveling, the second preliminary operation controller 130 cancels the second preliminary operation. For example, in a case in which, in the degree of approach between the threshold Th1.5# and the threshold Th1 (the TTC is "1.3"), it is determined that a curved road is present, and no target object is present in the lane L2, the second preliminary operation controller 130 cancels the second preliminary operation. In other words, in a case in which the recognizer 102 repeatedly recognizes target objects and lanes, and the second preliminary operation controller 130 determines that no target object is present in a lane in which the vehicle M is traveling among a plurality of lanes included in a curved road on the basis of a result of the recognition acquired by the recognizer 102, it cancels the preliminary operation.

For example, in a case in which the vehicle M becomes close to a curved road, the recognizer 102 can recognize the curved road and situations of vehicles present in the curved road. For example, in a case in which the recognizer 102 has recognized that no target object is present in the lane L2 and the lane L3 with a predetermined reliability level or more, the second preliminary operation controller 130 cancels the second preliminary operation. For example, the second preliminary operation controller 130 stops deceleration or suppresses deceleration to travel in the traveling direction.

FIG. 9 is a diagram (2) showing Restriction Technique 1. Differences from those shown in FIG. 8 will be focused in description. In a case in which it is determined that a target object is present in a lane in which the vehicle M is traveling among a plurality of lanes included in a curved road on the basis of a result of recognition acquired by the recognizer 102, the second preliminary operation controller 130 releases the restriction of the preliminary operation. As shown in FIG. 9, in a case in which the vehicle M becomes close to a curved road (for example, the TTC becomes Th1.3), in a case in which the recognizer 102 recognizes that target objects are present in the lane L1 and the lane L2 with a predetermined reliability level or more, the second preliminary operation controller 130 continues the second preliminary operation. For example, the second preliminary operation controller 130 continues deceleration.

As described above, by controlling the second preliminary operation, the second preliminary operation controller 130 can perform an appropriate preliminary operation according to surrounding situations of target objects.

Restriction Technique 2

Figure 10:
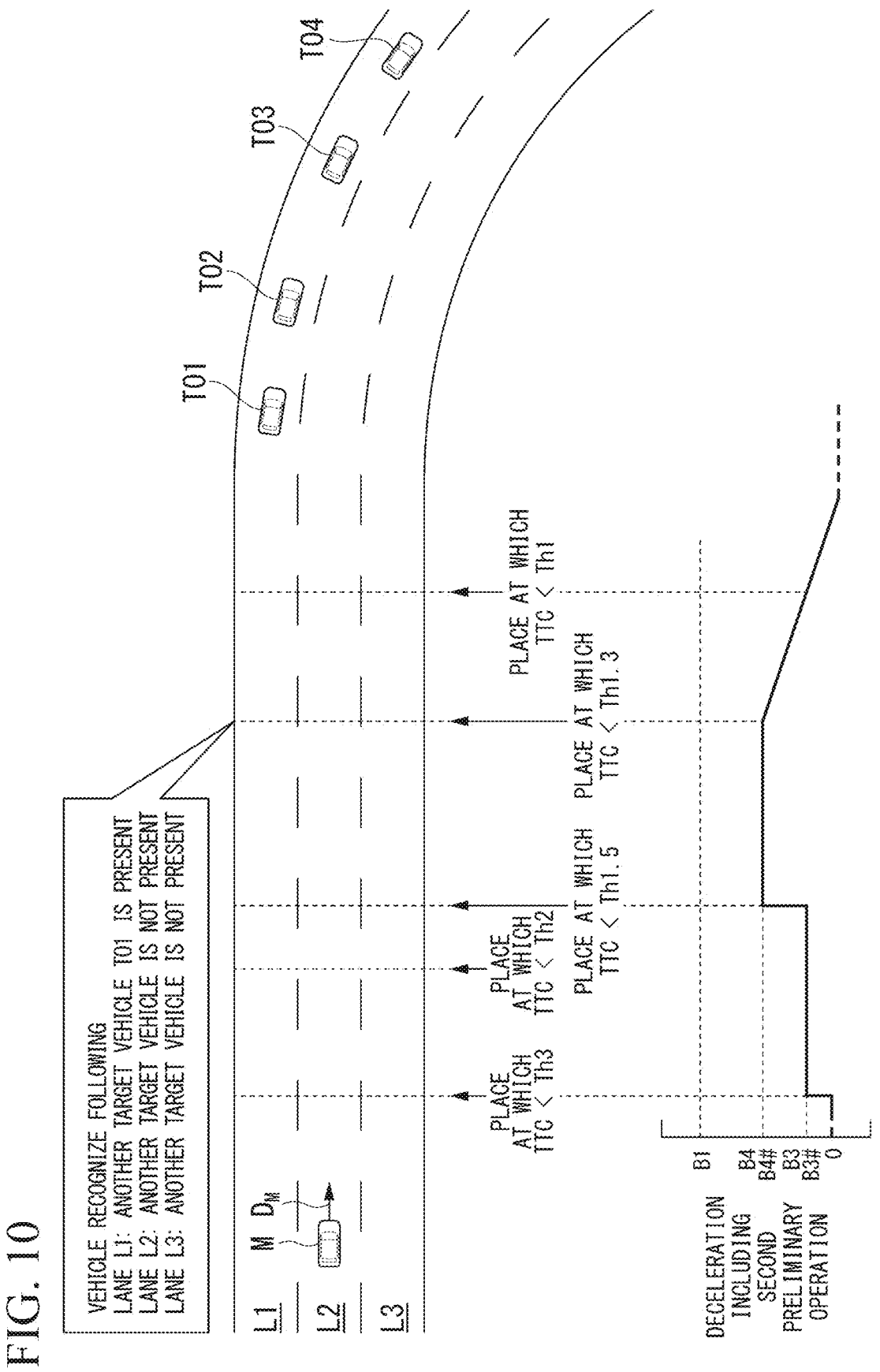
FIG. 10 A diagram (1) showing Restriction Technique 2.

FIG. 10 is a diagram (1) showing Restriction Technique 2. In a case in which it is determined that the degree of approach between a target object and a vehicle M satisfies a third condition, a curved road is present, and the target object is present on the front side (near a curved road), the second preliminary operation controller 130 executes the second preliminary operation. In this case, the second preliminary operation controller 130 suppresses deceleration more than a case in which it is determined that the degree of approach between the target object and the vehicle M satisfies the third condition, no curved road is present, and the target object is present on the front side (on a curved road or near a curved road). For example, the second preliminary operation controller 130 controls the vehicle M with a third deceleration B3 in a case in which no curved road is present and controls the vehicle M with a third deceleration B3# in a case in which a curved road is present. The third deceleration B3# is lower than the third deceleration B3.

In a case in which it is determined that the degree of approach between a target object and the vehicle M satisfies a 1.5-th condition, a curved road is present, and the target object is present on the front side (on the curved road or near the curved road), the second preliminary operation controller 130 executes the second preliminary operation. In this case, the second preliminary operation controller 130 suppresses the deceleration more than in a case in which it is determined that the degree of approach between the target object and the vehicle M satisfies the 1.5-th condition, no curved road is present, and the target object is present on the front side (on a curved road or near a curved road). For example, the second preliminary operation controller 130 controls the vehicle M with a fourth deceleration B4 in a case in which no curved road is present and controls the vehicle M with a fourth deceleration B4# in a case in which a curved road is present. The fourth deceleration B4# is lower than the fourth deceleration B4.

After the degree of approach between the target object and the vehicle M satisfies the 1.5 condition # (for example, after the TTC becomes less than the threshold Th1.5#), in a case in which it is determined that a curved road is present, and no target object is present in the lane L2, the second preliminary operation controller 130 cancels the second preliminary operation. For example, in a case in which, in the degree of approach between the threshold Th1.5# and the threshold Th1 (the TTC is "1.3"), it is determined that a curved road is present, and no target object is present in the lane L2, the second preliminary operation controller 130 cancels the second preliminary operation. In other words, in a case in which the recognizer 102 repeatedly recognizes target objects and lanes, and the second preliminary operation controller 130 determines that no target object is present in a lane in which the vehicle M is traveling among a plurality of lanes included in a curved road on the basis of a result of the recognition acquired by the recognizer 102, it cancels the preliminary operation.

Figure 11:
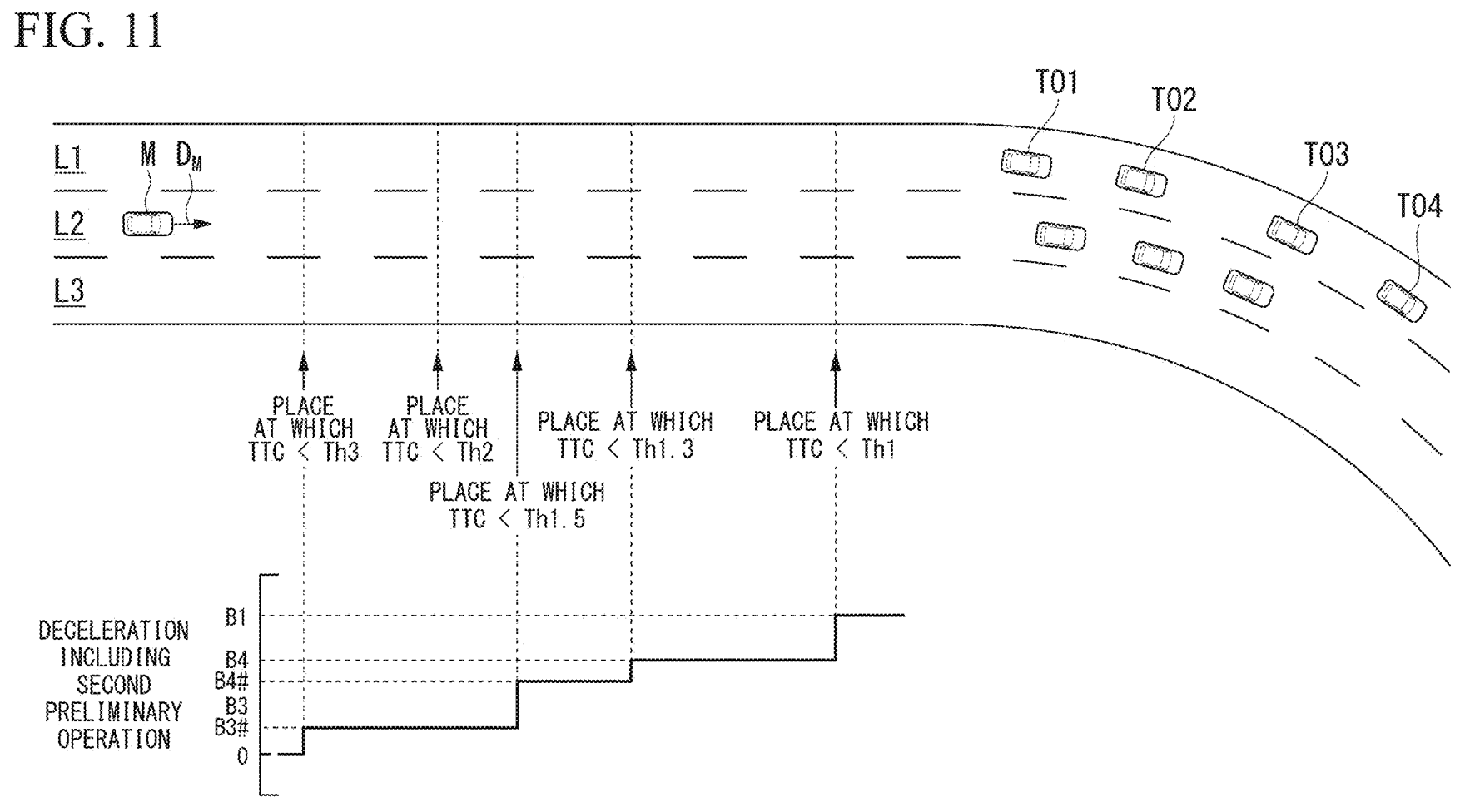

FIG. 11 is a diagram (2) showing Restriction Technique 2. Differences from those shown in FIG. 10 will be focused on in the description. As shown in FIG. 11, in a case in which the vehicle M becomes close to a curved road (or the target object TO1) (for example, the TTC becomes 1.3), in a case in which the recognizer 102 recognizes that target objects are present in the lane L1 and the lane L2 with a predetermined reliability level or more, the second preliminary operation controller 130 releases suppression of the second preliminary operation and continues the second preliminary operation. In this case, the second preliminary operation controller 130 raises the deceleration B4# of the vehicle M to the deceleration B4. In other words, in a case in which the recognizer 102 repeatedly recognizes target objects and lanes, and the second preliminary operation controller 130 determines that a target object is present in a lane in which the vehicle M is traveling among a plurality of lanes included in a curved road on the basis of a result of the recognition acquired by the recognizer 102, it releases the restriction of the preliminary operation.

As described above, by controlling the second preliminary operation, the second preliminary operation controller 130 can perform an appropriate preliminary operation according to a surrounding situation of a target object.

In the Restriction Technique 2 described above, although an example in which the deceleration is changed has been described, instead of (in addition to) this, the degree of notification in the case of a curved road may be restricted more than the degree of notification in the case of a non-curved road.

In addition, in the example described above, although it has been described that the recognizer 102 recognizes presence or non-presence of a target object in the lane L2 with a predetermined reliability level or more when the TTC is 1.3, also in accordance with this, in a case in which presence or non-presence of a target object in the lane L2 was recognized with a predetermined reliability level or more before, at that time point, the second preliminary operation may be canceled, or the restriction of the second preliminary operation may be released.

Restriction Technique 1 and Restriction Technique 2 described above may be combined together. For example, a timing at which the second preliminary operation is performed (or a timing at which the deceleration is changed) is delayed, and the second preliminary operation to be executed may be restricted more than the second preliminary operation executed in the case of a non-curved road.

Modified Example 1

In the example described above, although whether or not the road is a curved road has been described to be recognized by the recognizer 102, instead of (in addition to) this, the second preliminary operation controller 130 may recognize a curved road by referring to map information. The map information may be maintained by the navigation device 50 or may be a high-accuracy map stored in a storage device (not shown) of the vehicle M. The high-accuracy map is map information including more detailed information than map information.

FIG. 12 is a diagram showing one example of information 140 of curved roads included in map information. The information 140 of curved roads, for example, is information in which a shape of a road is associated with a link ID. The shape of a road is information representing a straight line or a curved road that is a target for control according to this embodiment or information representing a curved road that is not a target for control according to this embodiment. A curved road that is not a target for control according to this embodiment is a curved road for which the recognizer 102 can recognize lanes and target objects with a predetermined reliability level or more and, for example, has a gentle curve of which the curvature is a predetermined value or more.

The driving assistance device 100 executes control of Restriction Technique 1 or Restriction Technique 2 in a case in which a curved road that is a target for control according to this embodiment is present in a traveling direction and does not execute control of Restriction Technique 1 or Restriction Technique 2 in the case of a shape of another road.

The driving assistance device 100 may determine the degree of restriction of the second preliminary operation in accordance with the curvature of a curved road. FIG. 13 is a diagram showing one example of information 140# of curved roads included in map information. The information 140# of curved roads, for example, is information in which the curvature of a road is associated with a link ID. In the example shown in FIG. 13, information representing a large curvature (a gentle curve), an intermediate curvature, or a small curvature (a sharp curve) is associated with a link ID. In the example shown in FIG. 13, although the curvature is classified into three levels, it may be classified into two levels or three or more levels.

For example, the control according to this embodiment is not executed for a curved road of which the curvature is large, the control according to this embodiment is executed with Restriction Level 1 for a curved road of which the curvature is intermediate, and the control according to this embodiment is executed with Restriction Level 2 for a curved road of which the curvature is small. Restriction Level 2 may have the degree of restriction that is either higher or lower than that of Restriction Level 1. A large restriction level represents that deceleration or notification is performed at a later timing or the degree of deceleration or the degree of notification to be changed is suppressed.

As described above, since the driving assistance device 100 determines execution of the control according to this embodiment and the degree of restriction by referring to information representing the shape or the curvature of a road, an appropriate preliminary operation according to a surrounding situation of target objects can be performed.

Modified Example 2

The driving assistance device 100 may restrict the second preliminary operation in a case in which a curved road includes a plurality of lanes and not restrict the second preliminary operation in a case in which a curved road does not include a plurality of lanes (for example, in a case in which an oncoming lane is not present, and the number of lanes advancing in the traveling direction of the vehicle M is one). The reason for this is that, on a road in which a curved road does not include a plurality of lanes, in a case in which the recognizer 102 recognizes a target object, there is a high possibility of presence of a target object that becomes an obstacle in the traveling direction of the vehicle.

The driving assistance device 100 may take an oncoming lane into account. For example, on a one-lane road of a single side (a road composed of two lanes, and a first lane is a lane for traveling in a first direction, and a second lane different from the second lane is a lane for traveling in a second direction that is opposite to the first direction), in a case in which the recognizer 102 recognizes a target object, the restriction of control according to this embodiment may be performed.

Modified Example 3

In the example described above, although the second preliminary operation has been described as being restricted, instead of this, the first preliminary operation may be restricted. For example, in a case in which the recognizer 102 determines that space is determined as being present on the lateral side of a target object on a curved road (with reliability of a predetermined level or more), together with executing the first preliminary operation, the first preliminary operation may be restricted.

According to the embodiment described above, the driving assistance device 100 restricts a preliminary operation performed in a case in which a target object recognized by the recognizer 102 is present on a curved road more than a preliminary operation performed in a case in which a target object recognized by the recognizer 102 is not present on a curved road, and thus an appropriate preliminary operation according to a surrounding situation of the target object can be performed. For example, on a curved road, even in a case in which a lane in which the vehicle is present cannot be determined by the recognizer 102, a preliminary operation is inhibited from being excessively performed, and thus the discomfort of an occupant can be alleviated.

The embodiment described above can be represented as below.

A driving assistance device including a storage medium storing computer-readable instructions and a processor connected to the storage medium, the processor executing the computer-readable instructions to: perform one or both of stopping of a vehicle by instructing a brake device of the vehicle in a case in which an index value acquired by dividing a distance between a target object among objects and the vehicle by a relative speed is a first threshold by referring to an output of a detection device detecting presence of the objects that are present in front of the vehicle and instructing of a steering device of the vehicle to avoid contact with the target object using steering; and restrict a preliminary operation performed in a case in which the recognized target object is present on a curved road more than a preliminary operation performed in a case in which the target object recognized by a recognizer is not present on the curved road, in which the preliminary operation is executed in a case in which the index value is less than the first threshold.

As above, although the form for performing the present invention has been described using the embodiment, the present invention is not limited to such an embodiment at all, and various modifications and substitutions can be performed within a range not departing from the gist of the present invention.

Reference Signs List

10 Camera
12 Radar device
14 LIDAR
16 Object recognition device
80 Driving operator
100 Driving assistance device
102 Recognizer
110 Brake controller
112 First preliminary operation controller

19

120 Steering avoidance controller
130 Second preliminary operation controller
132 Steering avoidance feasibility determiner
200 Traveling driving force output device
210 Brake device
220 Steering device

What is claimed is:

1. A driving assistance device comprising:
a storage medium storing computer-readable instructions; and
one or more processors connected to the storage medium, the processors executing the computer-readable instructions to:
stop a vehicle by instructing a braking device of the vehicle,
in a case in which a degree of approach, between a target object among objects and the vehicle, satisfies a first condition, by referring to an output of a detection device detecting presence of the objects that are present in front of the vehicle;
instruct a steering device of the vehicle to avoid a contact with the target object using steering; and
restrict a preliminary operation performed in a case in which the target object is present on a curved road more than a preliminary operation performed in a case in which the target object is not present on a curved road,
wherein the preliminary operation is executed in a case in which the degree of approach between the vehicle and the target object is lower than the first condition, and wherein the restricting of the preliminary operation delays:
a time at which the preliminary operation is performed, and
a time at which the vehicle is decelerated.

2. A driving assistance device, comprising:
a storage medium storing computer-readable instructions; and
one or more processors connected to the storage medium, the processors executing the computer-readable instructions to:
stop a vehicle by instructing a braking device of the vehicle in a case in which a degree of approach between a target object among objects and the vehicle satisfies a first condition by referring to an output of a detection device detecting presence of the objects that are present in front of the vehicle;
instruct a steering device of the vehicle to avoid a contact with the target object using steering; and
restrict a preliminary operation performed in a case in which the target object is present on a curved road more than a preliminary operation performed in a case in which the target object is not present on a curved road;
wherein the preliminary operation is executed in a case in which the degree of approach between the vehicle and the target object is lower than the first condition,
wherein the restricting of the preliminary operation is delaying a timing delays a time at which the preliminary operation is performed, and
the restricting of the preliminary operation delays a time at which an operation of giving a notification to a driver of the vehicle.

3. The driving assistance device according to claim 1, wherein the preliminary operation comprises an operation of raising a deceleration level of the vehicle or an operation of giving a notification to a driver of the vehicle.

4. A driving assistance device, comprising:
a storage medium storing computer-readable instructions; and
one or more processors connected to the storage medium, the processors executing the computer-readable instructions to:
stop a vehicle by instructing a braking device of the vehicle in a case in which a degree of approach between a target object among objects and the vehicle satisfies a first condition by referring to an output of a detection device detecting presence of the objects that are present in front of the vehicle;
instruct a steering device of the vehicle to avoid a contact with the target object using steering; and
restrict a preliminary operation performed in a case in which the target object is present on a curved road more than a preliminary operation performed in a case in which the target object is not present on a curved road,
wherein the preliminary operation is executed in a case in which the degree of approach between the vehicle and the target object is lower than the first condition,
wherein the preliminary operation comprises an operation of raising a deceleration level of the vehicle, and an operation of giving a notification to the driver of the vehicle, and
wherein the restricting of the preliminary operation comprises:
restricting a degree of raising of the deceleration level more than a degree of raising of the deceleration level performed in a case in which the target object is not present on a curved road, and
restricting a degree of the notification more than a degree of the notification performed in a case in which the target object is not present on a curved road.

5. The driving assistance device according to claim 1, wherein the preliminary operation comprises an operation of giving a notification to the driver of the vehicle, and wherein the restricting of the preliminary operation comprises restricting a degree of the notification more than a degree of the notification performed in a case in which the target object is not present on a curved road.

6. The driving assistance device according to claim 1, wherein the one or more processors executes the computer-readable instructions to, at least one of:
recognize the curved road by referring to an output of a detection device, or
recognize the curved road by referring to information included in map information.

7. The driving assistance device according to claim 1, wherein the one or more processors execute the computer-readable instructions to determine a degree of the restricting of the preliminary operation in accordance with a curvature of a curve of the curved road.

8. The driving assistance device according to claim 1, wherein the one or more processors execute the computer-readable instructions to:
restrict the preliminary operation in a case in which the curved road includes a plurality of lanes; and
perform no restriction of the preliminary operation in a case in which the curved road does not include a plurality of lanes.

9. The driving assistance device according to claim 1, wherein the one or more processors execute the computer-readable instructions to:
recognize objects by referring to the output of the detection device;

execute a process of repeatedly recognizing an object present on a curved road after it is determined that the recognized target object is present on the curved road;

cancel the preliminary operation in a case in which it is determined that the object is not present in a lane in which the vehicle is traveling among a plurality of lanes included in the curved road on the basis of a result of the recognition; and release the restriction of the preliminary operation in a case in which it is determined that the object is present in a lane in which the vehicle is traveling among the plurality of lanes included in the curved road on the basis of the result of the recognition.

10. The driving assistance device according to claim 1, wherein the one or more processors execute the computer-readable instructions to:

perform the preliminary operation in a case in which it is determined:

that the degree of approach satisfies a predetermined condition that is lower than the first condition, and a travelable space after the avoidance using the steering is not present in any of traveling roads of a lateral side of the target object, at a time point at which the predetermined condition is satisfied, in a case in which the target object is not present on a curved road.

11. A driving assistance method using a driving assistance device, the driving assistance method comprising:

stopping a vehicle by instructing a braking device of the vehicle in a case in which a degree of approach between a target object among objects and the vehicle satisfies a first condition by referring to an output of a detection device detecting presence of the objects that are present in front of the vehicle;

instructing a steering device of the vehicle to avoid a contact with the target object using steering; and restricting a preliminary operation performed in a case in which the target object is present on a curved road more than a preliminary operation performed in a case in which the target object is not present on a curved road, wherein the preliminary operation is executed in a case in which the degree of approach between the vehicle and the target object is lower than the first condition, and wherein the restricting of the preliminary operation delays:

a time at which the preliminary operation is performed, and a time at which the vehicle is decelerated.

\* \* \* \* \*